(12) United States Patent
Loubert et al.

(10) Patent No.: US 7,469,706 B1
(45) Date of Patent: Dec. 30, 2008

(54) ADJUSTABLE PRESSURE DOUBLE LATCHING VALVE

(75) Inventors: Craig A. Loubert, Plymouth, MN (US); William P. Nugent, Wayzata, MN (US)

(73) Assignee: Pneumadyne, Inc., Plymouth, MN (US)

( * ) Notice: Subject to any disclaimer, the term of this patent is extended or adjusted under 35 U.S.C. 154(b) by 0 days.

(21) Appl. No.: 11/670,615

(22) Filed: Feb. 2, 2007

Related U.S. Application Data

(60) Provisional application No. 60/764,705, filed on Feb. 2, 2006.

(51) Int. Cl.
*F16K 31/12* (2006.01)

(52) U.S. Cl. ......................... 137/14; 137/488

(58) Field of Classification Search ................ 137/613, 137/12, 14, 485, 488
See application file for complete search history.

(56) References Cited

U.S. PATENT DOCUMENTS

| | | | | |
|---|---|---|---|---|
| 5,725,015 | A | * | 3/1998 | Theodos et al. ............. 137/488 |
| 6,095,184 | A | * | 8/2000 | Neff et al. .................... 137/488 |
| 6,530,363 | B1 | * | 3/2003 | Blass et al. .................. 123/446 |
| 6,733,253 | B2 | * | 5/2004 | Vockroth .................... 417/401 |

* cited by examiner

*Primary Examiner*—Kevin L Lee
(74) *Attorney, Agent, or Firm*—Moore & Hansen, PLLP

(57) ABSTRACT

Methods and devices for maintaining a minimum pressure of calibration gas, such as in an emission testing system or a similar arrangement, using a double latching valve (DLV). The DLV comprises a body having specific internal passages; a two-way normally closed (blocked) shut-off valve; an enlarged low pressure, sensitive air pilot acting upon the two-way valve; an adjustable sequencing latch valve integrated into the supply latch circuit; and a defined orifice incorporated into the supply latch circuit.

13 Claims, 4 Drawing Sheets

ADJUSTABLE PRESSURE DOUBLE LATCHING VALVE

CROSS-REFERENCE TO RELATED APPLICATION

The application claims the benefit of U.S. Provisional Application 60/764,705 filed Feb. 2, 2006.

TECHNICAL FIELD

The invention involves methods and devices for maintaining calibration of equipment used for vehicle emissions testing.

BACKGROUND

In the field of gas content testing, calibration gases may be used to calibrate testing equipment to a known value. The calibration gas is a specific, known mixture of compounds in proper proportions and otherwise known values. For example, in the field of vehicle emissions testing, the calibration gas contains the pollutants typical of those emitted by the vehicles undergoing regular inspection as part of license renewal procedures and other procedures.

At various intervals, usually when the testing equipment is started up, the calibration gas is introduced to the test equipment and the test equipment is calibrated to the known values of the calibration gas. It is important that the pressure of the calibration gas not drop below a specific value, or the proper proportions cannot be maintained. When the calibration is done, the calibration gas is turned off and testing begins.

Each time a calibration is performed, the testing device must ensure that the pressure of the calibration gas is above a preset level. Once turned off, if the gas goes below the preset pressure value, the testing equipment must not allow any flow of gas to the tester to begin until a renewed gas source is installed and reaches the predefined set pressure value.

SUMMARY OF THE INVENTION

The invention involves methods and devices for maintaining a minimum pressure of calibration gas, such as in an emission testing system or a similar arrangement. The specific device is a double latching valve (DLV). In one embodiment, the DLV comprises five main elements. The first is a body having specific internal passages that link the internal elements in specific ways. The second is a two-way normally closed (blocked) shut-off valve. The third is an enlarged low pressure, sensitive air pilot acting upon the two-way valve, which together comprise the supply latch circuit. The fourth is an adjustable sequencing latch valve that is integrated into the supply latch circuit. The fifth is a defined orifice incorporated into the supply latch circuit.

BRIEF DESCRIPTION OF THE DRAWING

The accompanying drawing shows a particular embodiment of the invention as an example, and is not intended to limit the scope of the invention.

DETAILED DESCRIPTION

This application, solely for convenience of description, omits discussion of fittings and the like that would be understood by the person of ordinary skill in the art of piping to be desirable, necessary, or included for any purpose.

Figure 1:
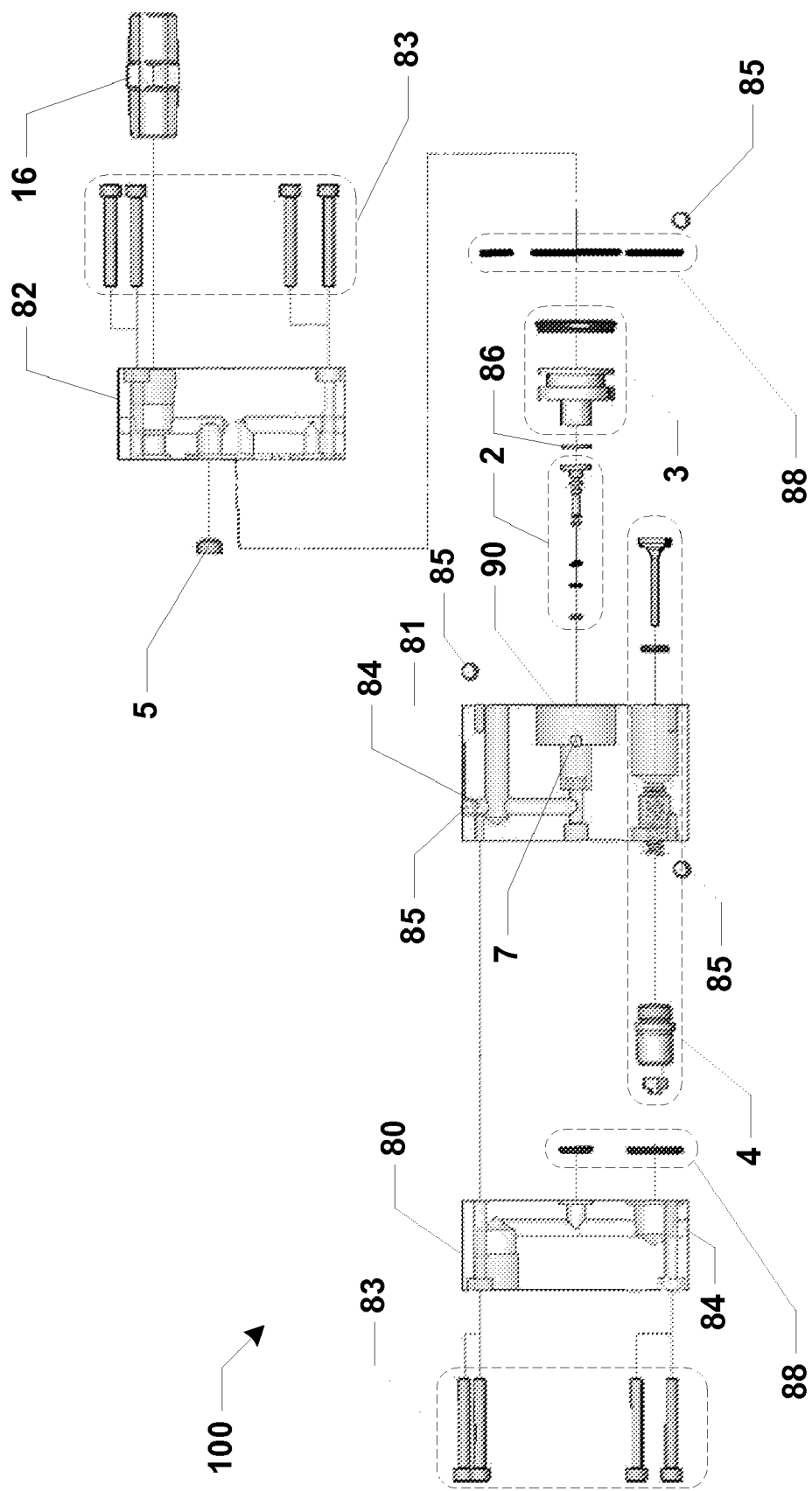
FIG. 1 is a schematic exploded cross-sectional side view of one embodiment of the invention.
Figure 2:
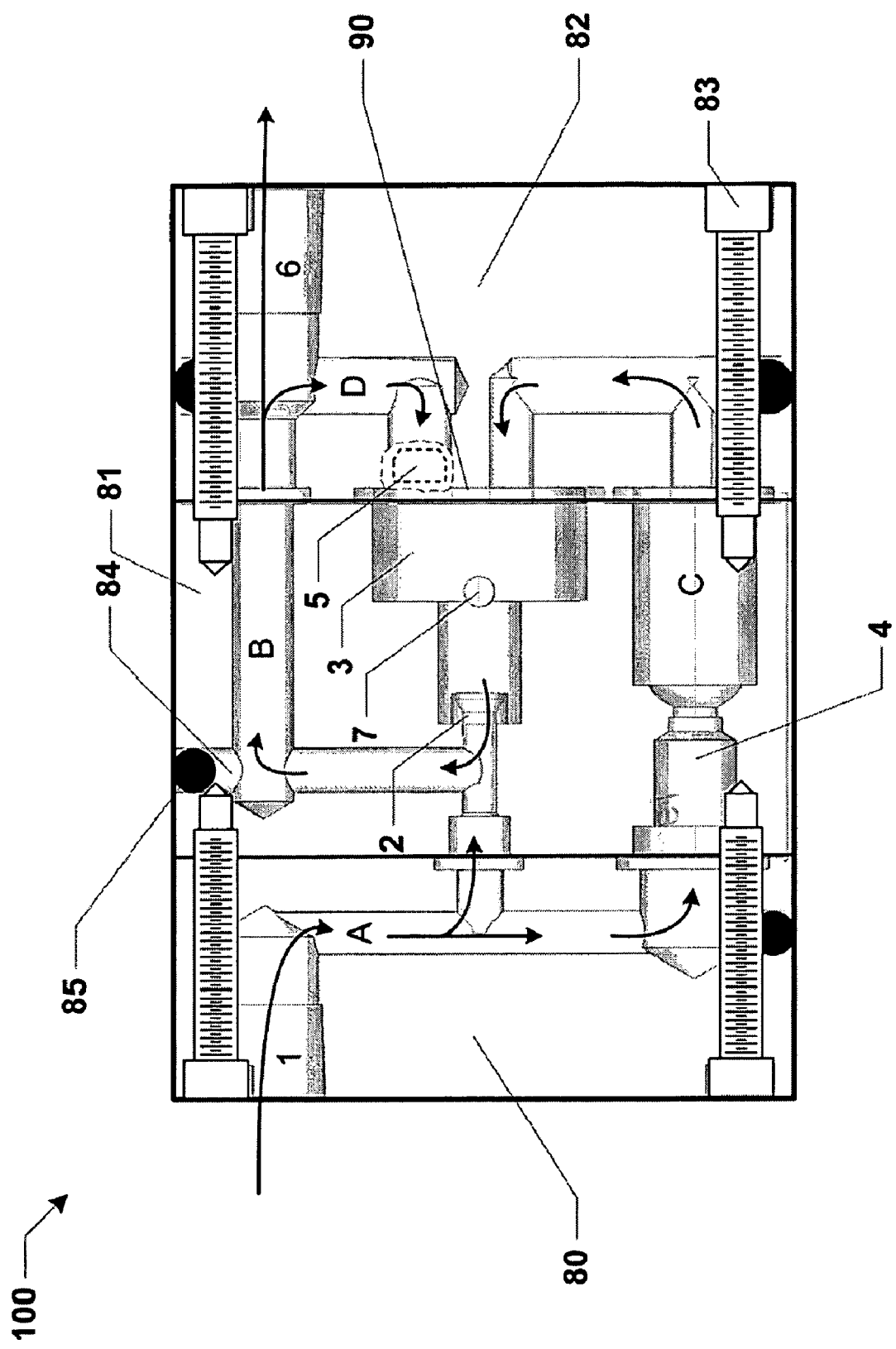
FIG. 2 is a schematic cross-sectional side view of the embodiment of FIG. 1, from which selected internal components have been removed for clarity.

FIG. 1 is a schematic exploded cross-sectional side view of one embodiment of the invention. FIG. 2 is a schematic cross sectional side view of a portion of the components of FIG. 1 as assembled together, from which some of the components illustrated in FIG. 1 have been removed solely for clarity.

Referring to FIGS. 1 and 2, the DLV 100 is installed in the supply port of the testing equipment, between the calibration gas source on/off valve (not shown) and the testing device (not shown). In the normal mode of operation, when calibration gas pressure is higher than the low set limit of the sequencing latch valve (described below), gas enters the input 1 in the direction indicated by the arrow on the left side of the figure, and travels into gas passage A. Adjustable sequencing latch valve 4 opens because the supplied pressure is above the set pressure (e.g., 16.5 pounds/square inch); thus, gas flows into passage C. The gas then flows into the low pressure pilot valve 3 depressing the pilot piston, which in turn opens the two-way normally closed valve 2.

The "under pilot vent" 7 prevents any leakage past either the pilot seal or the valve seal from building up under the pilot (a closed volume). Such a buildup would balance the pilot piston, thus allowing the valve stem spring to close the valve even though pressure existed on the top of the piston. Trapped gas in this volume could also prevent the shifting of the pilot piston when pressurized. It is preferred to have two under pilot vents 7, one on each side of DLV 100 (only one is visible in the Figures).

When two-way normally closed valve 2 opens, calibration gas flows through it into passage B which directs the volume of calibration gas to the output port 6 and thus into the testing device (i.e., in the direction indicated by the arrow on the right side of the figure). At the same time, a small portion of the calibration gas is directed into channel D which flows through dampening orifice 5 and into the pilot piston cavity 90, thus forming a latch that holds low pressure pilot valve 3 open. Now that the latch is set, the adjustable sequencing latch valve 4 will close because the pressure is equalized on both sides of the valve, but the two-way normally closed valve 2 is fully set open, so flow continues. The dampening orifice 5 protects two-way normally closed valve 2 from closing, even partially, in response to pressure drops in the output line 6, thus preventing starvation of calibration gas to the testing device. This orifice also assists in the orderly purging of DLV 100, as described below.

When calibration is complete, the on/off valve is closed and the testing device consumes all the remaining gas in the device by first consuming what is left in channels B, D, and A, followed by channel C. Dampening orifice 5 slows down flow out of channel C, and also allows the valve to be held open for a longer period to allow channel A to vent before the pilot piston is allowed to return (thus closing the valve).

Should the pressure valve in the calibration gas supply tank (not shown) drop below the set value of adjustable sequencing latch valve 4, this valve will not open, thus preventing the pilot piston from shifting and opening two-way normally closed valve 2. This prevents an inaccurate low pressure reading on the tester during the calibration phase, and requires that the calibration gas source be renewed.

In the embodiment illustrated, DLV 100 is assembled from three sections, input block 80, valve block 81, and output block 82 that are individually manufactured (e.g., milled from solid metal, molded in plastic, or by other known equivalent techniques). Assembly may be with socket head cap screws 83 (or equivalent fasteners) (typical of 8 shown, although the number is not critical). Screws 83 fit into threaded holes in the various sections as required. Access openings 84 (typical of 4 shown) may be required to manufacture the various internal passages A-D and others illustrated in the Figures. Upon assembly into DLV 100, these access openings are filled with plugs 85 (typical of 4 shown) in accordance with known principles. This is only a preferred embodiment, as the scope of the invention includes a unitary DLV, or one manufactured in another manner, provided it operates in accordance with the principles of the invention.

FIG. 1 includes several components that would be understood by the person of ordinary skill in the art as desirable to a commercial product incorporating the principles of the invention, such as spacer 86 between two-way normally closed valve 2 and the piston of low pressure pilot valve 3, and various O-rings 88 that ensure proper seal between input block 80, valve block 81, and output block 82. Spacer 86 is optional but may be desirable to enable an embodiment of the invention to be assembled from existing components. Other embodiments of the invention may accomplish the same result by extending the top of the stem of opening valve 2 or the bottom of the piston of low pressure pilot valve 3, if required.

It is also preferred, but not required, to include an output fitting 16 such as a Polyconn (Plymouth, Minn.) model PC122B brass hex nipple in any required size (e.g., ¼" NPT (M)). Dampening oriface 5 may be a commercially available component such as a type IA oriface available from O'Keefe Controls Company (Monroe, Conn.).

Figure 3:
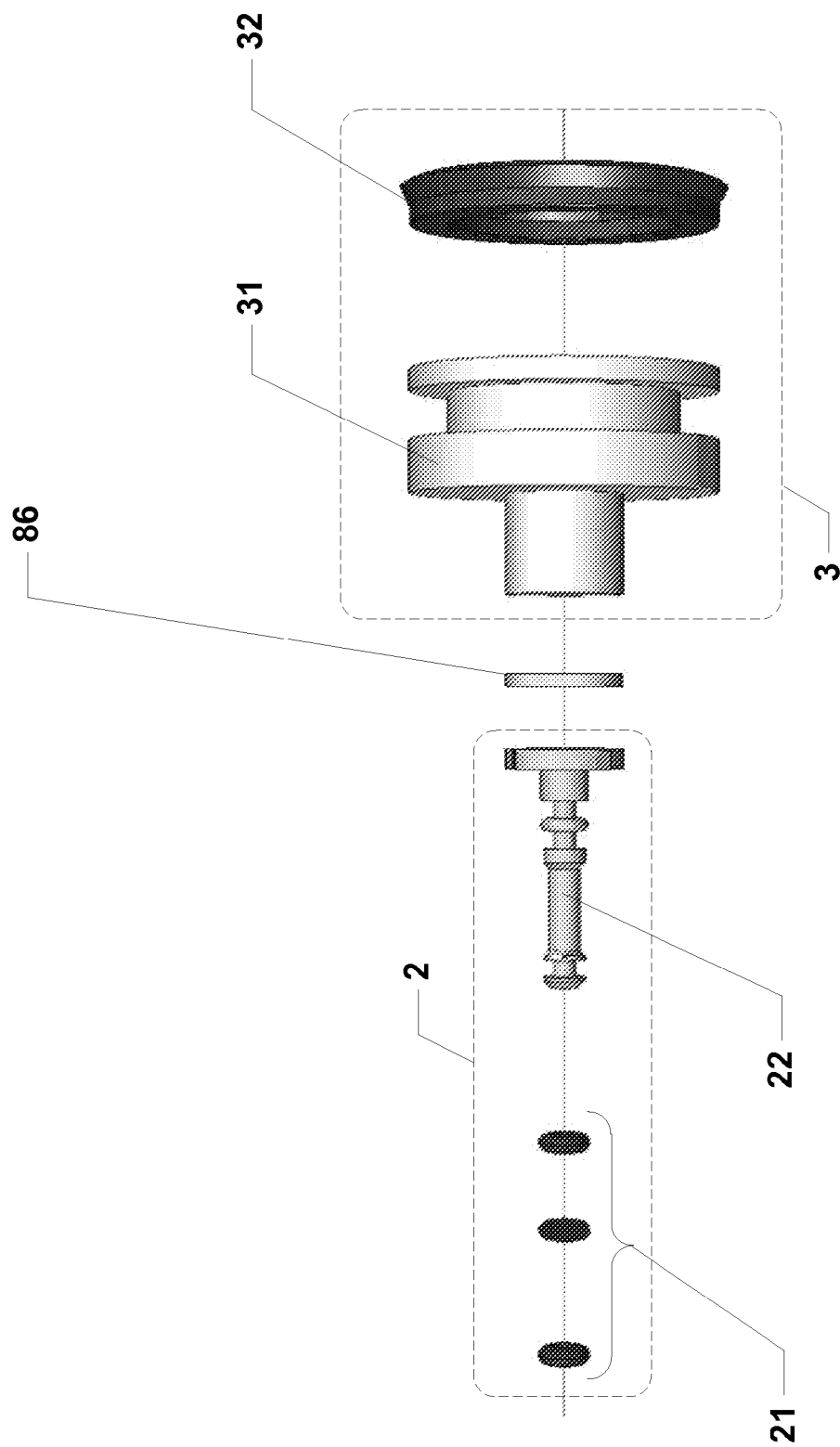
FIGS. 3 and 4 are close-up side views of selected components of FIG. 1.
Figure 4:
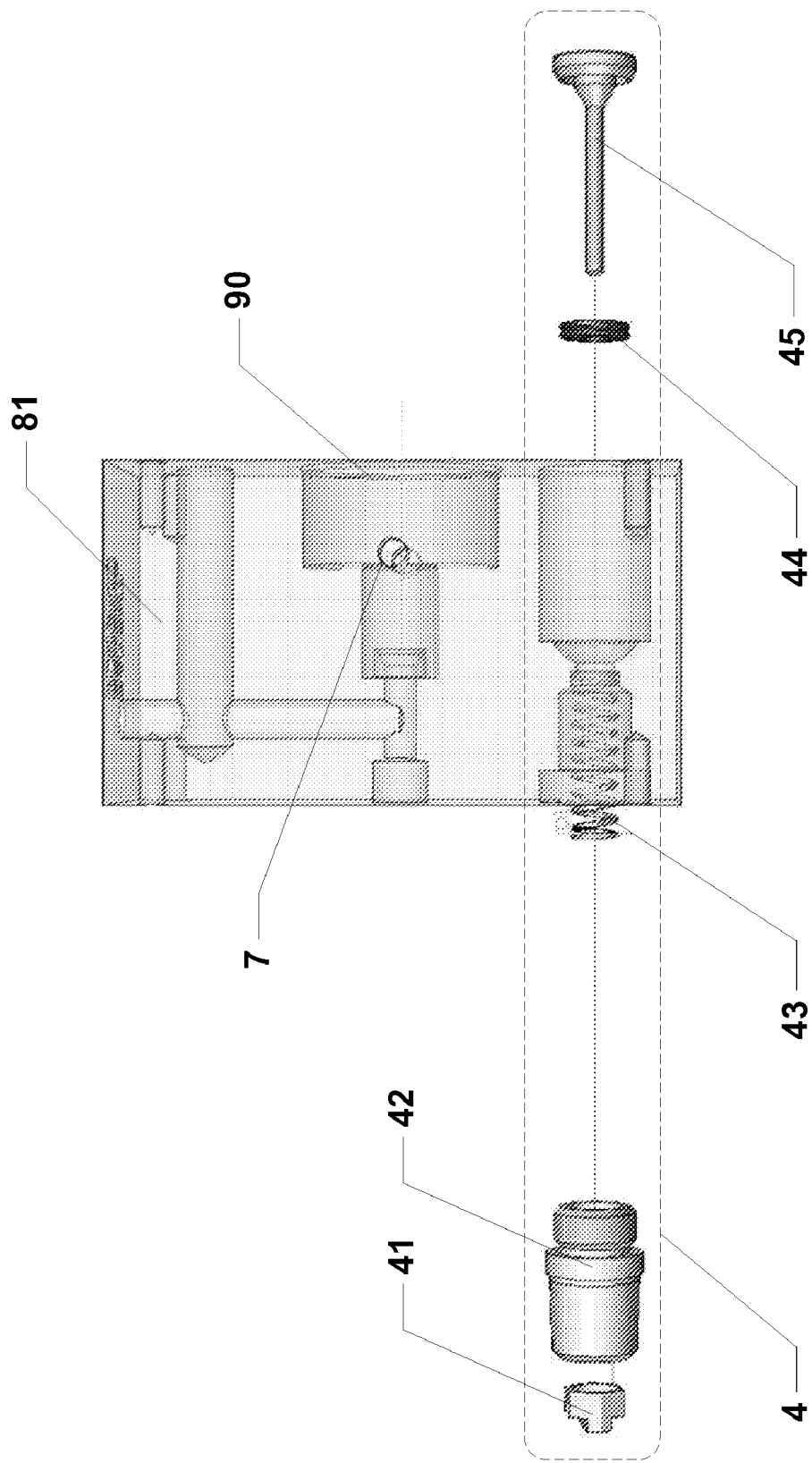

FIGS. 3 and 4 illustrate preferred components and constructions of two-way normally closed valve 2, low pressure pilot valve 3, and adjustable sequencing latch valve 4. FIG. 3 shows that two-way normally closed valve 2 comprises valve stem 22 and three O-rings 21. Low pressure pilot valve 3 comprises low pressure piston 31 and U-cup 32. Two-way normally closed valve 2 and low pressure pilot valve 3 are arranged on a common central axis and separated by spacer 86. FIG. 4 shows that adjustable sequencing latch valve 4 comprises spring retainer 41, broached insert valve guide 42, spring 43, X-ring 44 and poppet 45. All of these components are manufactured and assembled together according to principles known in the art. Although not explicitly shown in FIG. 4, it is preferred that to implement the adjustable pressure set point feature of the invention into adjustable sequencing latch valve 4 by threading the interior of spring retainer 41 to mate with threads on the shaft of poppet 45. Then, because broached insert valve guide 42 holds spring retainer 41 in place, poppet 45 may be rotated (e.g., by use of a hex key in a slot on the top of poppet 45) to compress spring 43 until the desired set point is reached.

The scope of the invention is not limited to the particular embodiment illustrated in FIG. 1 or 2, which are only preferred for currently commercialized vehicle emissions testing systems. The scope of the invention includes embodiments for systems used in other sectors of the economy. It should also be understood that the principles of the invention may apply to systems employing a liquid or other type of fluid, and not just a calibration gas.

We claim:

1. A double latching valve assembly for maintaining a minimum pressure of calibration gas, comprising:

a) a supply latch circuit, comprising (i) a two-way normally closed shut-off valve, and (ii) an enlarged low pressure, sensitive air pilot acting upon the shut-off valve;
b) an adjustable sequencing latch valve integrated into the supply latch circuit; and
c) an orifice incorporated into the supply latch circuit.

2. The double latching valve assembly of claim 1, in which the pilot prevents balancing of the shut-off valve.

3. The double latching valve assembly of claim 1, in which opening of the shut-off valve (1) directs calibration gas to flow through the shut-off valve to an output port of the double latching valve assembly; and (2) directs a smaller portion of the calibration gas through the orifice to latch the shut-off valve open.

4. The double latching valve assembly of claim 3, in which the sequencing latch valve closes due to equalized pressure despite continued flow of calibration gas through the shut-off valve.

5. The double latching valve assembly of claim 1, in which the orifice protects the shut-off valve from closing, even partially, in response to pressure drops in an output of the double latching valve, to prevent starvation of calibration gas to the output.

6. The double latching valve assembly of claim 1, in which the orifice holds the shut-off valve open when the double latching valve assembly is purged of calibration gas.

7. The double latching valve assembly of claim 1, in which the double latching valve assembly comprises multiple sections that are individually manufactured and assembled together.

8. The double latching valve assembly of claim 1, in which the double latching valve assembly has a unitary construction.

9. The combination of the double latching valve assembly of claim 1, and testing equipment having a supply port to which the double latching valve assembly is connected.

10. The combination of claim 9, in further combination with a calibration gas source connected to an input port to the double latching valve assembly.

11. A double latching valve assembly comprising: a body defining a supply latch circuit; in the supply latch circuit, a two-way normally closed shut-off valve and an enlarged low pressure, sensitive air pilot acting upon the two-way valve; an adjustable sequencing latch valve integrated into the supply latch circuit; and a defined orifice incorporated into the supply latch circuit; in which the double latching valve assembly maintains a minimum pressure of gas passing through the double latching valve assembly.

12. A method for maintaining a minimum pressure of a calibration gas, comprising:

a) providing the calibration gas at a pressure higher than a set point of an adjustable sequencing latch valve assembly;
b) providing a supply latch circuit comprising a two-way normally closed shut-off valve and an air pilot acting upon the shut-off valve;
c) opening the two-way normally closed shut-off valve but using the air pilot to prevent closure of the two-way normally closed shut-off valve while the calibration gas passes through the adjustable sequencing latch valve to an outlet; and
d) providing limited backflow from the outlet to the supply latch circuit.

13. The method of claim 12, in which the limited backflow from the outlet to the supply latch circuit is provided by an orifice.

* * * * *